Figure 1:
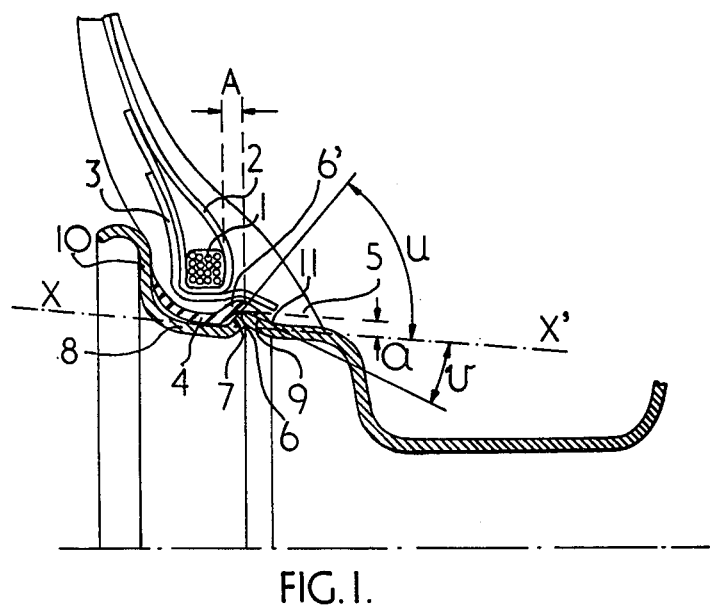

United States Patent
Nebout

[11] 3,915,215
[45] Oct. 28, 1975

[54] PNEUMATIC TIRE AND WHEEL ASSEMBLY

[75] Inventor: Noel Nebout, Montlucon, France

[73] Assignee: Dunlop Limited, London, England

[22] Filed: Mar. 26, 1973

[21] Appl. No.: 345,137

[30] Foreign Application Priority Data
Mar. 24, 1972 France .............................. 72/10427

[52] U.S. Cl. .................. 152/379; 152/362; 152/384
[51] Int. Cl. ............................................. B60c 5/16
[58] Field of Search ........... 152/307, 362, 375, 379, 152/381, 384, 385, 388, 399, 411, 414; 301/97, 98

[56] References Cited
UNITED STATES PATENTS

| | | | |
|---|---|---|---|
| 1,092,078 | 3/1914 | Overman | 152/379 |
| 1,895,582 | 1/1933 | Millican | 152/362 R |
| 3,540,510 | 11/1970 | Smithkey, Jr. | 152/353 |

*Primary Examiner*—Drayton E. Hoffman
*Attorney, Agent, or Firm*—Stevens, Davis, Miller & Mosher

[57] ABSTRACT

A pneumatic tire and wheel assembly comprises a wheel provided with a circumferentially extending lip which projects radially outwardly from the tire bead seat into a circumferentially extending groove on the tire bead to prevent axial movement of the tire across the wheel rim.

11 Claims, 2 Drawing Figures

PNEUMATIC TIRE AND WHEEL ASSEMBLY

The present invention relates to pneumatic tire and wheel assemblies.

Pneumatic tires are generally mounted on a wheel rim by locating the tire beads in bead seats lying adjacent two circumferential flanges on either side of the wheel rim. When the tire is inflated the tire beads are held in the bead seats by the internal air pressure within the tire which holds the tire beads firmly against the flanges. If, for any reason, the inflation pressure falls the tire beads may be displaced from their seats and the tire will no longer be fixedly mounted on the wheel rim. If the wheel rim is of the well-base type this displacement of the tire beads is particularly disadvantageous since there is a tendency for the tire beads to fall into the well of the wheel rim resulting in the displacement of the tire from the rim of the wheel.

It is therefore an aim of the present invention to provide a pneumatic tire and wheel assembly in which the tire beads are retained in the bead seats on the wheel rim even when the tire is completely deflated.

Accordingly the present invention provides a wheel rim for mounting a pneumatic tire comprising a pair of annular flanges each disposed adjacent a bead seat for receiving a bead of a pneumatic tire, at least one of the bead seats being provided with a circumferentially extending lip projecting radially outwardly from the bead seat, said lip being inserted into a groove on the tire bead when a tire is mounted on the rim to prevent axial movement of the tire across the wheel rim.

The circumferentially extending lip preferably has a triangular cross-section, the axially outer surface having a steeper slope than the axially inner surface.

Preferably the lip projects a distance between 1.5 and 5 mm radially outwardly from the bead seat. The axially inner surface is usually inclined at an angle between 10° and 30° to the bead seat surface and the axially outer surface at an angle between 30° and 90° to the bead seat surface.

The invention also provides a pneumatic tire for mounting on a wheel rim according to the present invention comprising a tread and two sidewalls each terminating in a tire bead, at least one of the tire beads having on a bead seat contacting surface a circumferentially extending groove which, when the tire is mounted on the wheel rim, receives a radially projecting lip on the bead seat of the wheel rim which prevents axial movement of the tire across the wheel rim.

The tire bead may comprise a bead wire located axially outwardly of the circumferentially extending groove.

The surface defining the circumferentially extending groove and the portion of the bead seat contacting surface disposed axially outwardly of the groove preferably comprises an outer layer of hard rubber. The reinforcing ply may be wrapped at least partly around the bead wire, terminating in an annular surface extending at least partly across the outer layer of hard rubber.

The invention also provides a pneumatic tire and wheel assembly comprising a pneumatic tire having a tread and two sidewalls each terminating in a tire bead and a wheel rim having a pair of annular flanges each disposed adjacent a bead seat for receiving a bead of a pneumatic tire, at least one of the bead seats being provided with a circumferentially extending lip projecting radially outwardly from the bead seat, said lip being inserted into a circumferentially extending groove in the tire bead to prevent axial movement of the tire across the wheel rim.

Figure 2:
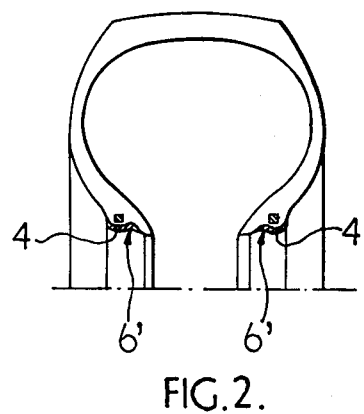

A specific example of a pneumatic tire and wheel assembly according to the present invention will now be described, by way of example and with reference to the accompanying drawings in which FIG. 1 is a diagrammatic representation showing a section through a part of a pneumatic tire and wheel assembly and FIG. 2 is a diagrammatic representation showing a section through a pneumatic tire.

The wheel rim comprises a bead seat 8 which receives the bead of the tire when it is mounted on the rim and a circumferentially extending lip 6 on the bead seat 8 projects radially outwardly from the bead seat 8 into a circumferentially extending groove 6' formed in the tire bead. The circumferentially extending lip 6 has a triangular cross-section, its axially outer surface 7 forming an angle U of between 30° and 90° to a line X–X' contiguous with the surface of the bead seat 8 and its axially inner surface 9 forming an angle $v$ between 10° and 30° to the line X–X'.

The surface defining the circumferentially extending groove 6' and the portion of the bead contacting surface disposed axially outwardly of the groove is provided with a layer 4 of hard rubber having a Shore A hardness of at least 80. This hard rubber layer 4 is terminated at the axially inner point 11 of the groove 6' so that the toe 5 of the bead retains its flexibility.

A reinforcing ply 3 of wire gauze is wrapped partly around the bead wire 1 and terminates in an annular surface overlying the hard rubber layer 4. When the bead is located on the bead seat, the axial distance between the axially inner surface of the bead wire 1 and the apex of the lip 6 is between 2 and 6 mm.

It will be appreciated that the radially projecting lip 6 on the bead seat 8 co-operates with the circumferentially extending groove 6' on the tire bead to prevent axial movement of the tire bead from the bead seat when the tire is deflated. This arrangement can be employed in wheels and tires of all types with or without inner tubes, but is of particular advantage where the wheel rim is a well base rim, as illustrated in FIG. 1.

Having now described my invention, what I claim is:

1. A pneumatic tire for mounting on a wheel rim having a circumferentially extending lip projecting radially outwardly from at least one of its bead seats comprising a tread, two sidewalls each terminating in a tire bead and a circumferentially extending groove located on a bead seat contacting surface of at least one of the tire beads, which when the tire is mounted on the wheel rim, receives said radially projecting lip to prevent axial movement of the tire across the wheel rim, the surface defining the circumferentially extending groove and the portion of the bead seat contacting surface disposed axially outwardly of the groove having an outer layer of hard rubber.

2. A pneumatic tire as claimed in claim 1 in which the tire bead has a bead wire located axially outwardly of the circumferentially extending groove.

3. A pneumatic tire as claimed in claim 1 in which the tire bead has a bead wire and a reinforcing ply wrapped at least partly around the bead wire and terminating in an annular surface extending at least partly across the outer layer of hard rubber.

4. A pneumatic tire and wheel assembly comprising a pneumatic tire having a tread and two sidewalls each terminating in a tire bead, a wheel rim having a pair of annular flanges each disposed adjacent a bead seat for receiving a bead of the pneumatic tire, a circumferentially extending groove in at least one of the tire beads and a circumferentially extending lip projecting radially outwardly from at least one of the bead seats into the circumferentially extending groove to prevent axial movement of the tire across the wheel rim the surface defining the circumferentially extending groove and the portion of tire bead in contact with the bead seat axially outwardly of the groove having an outer layer of hard rubber.

5. A pneumatic tire and wheel assembly as claimed in claim 4 in which the circumferentially extending lip has a triangular cross-section, the axially outer surface having a steeper slope than the axially inner surface.

6. A pneumatic tire and wheel assembly as claimed in claim 5 in which the axially inner surface is inclined to the surface of the bead seat at an angle of between 10° and 30°.

7. A pneumatic tire and wheel assembly as claimed in claim 5 in which the axially outer surface is inclined at an angle of between 30° and 90° to the surface of the bead seat.

8. A pneumatic tire and wheel assembly as claimed in claim 4 in which the circumferentially extending lip projects radially outwardly for a distance between 1.5 and 5 mm.

9. A pneumatic tire and wheel assembly as claimed in claim 4 in which the wheel rim is a well-base rim.

10. A pneumatic tire and wheel assembly as claimed in claim 4 in which the tire bead comprises a bead wire located axially outwardly of the circumferentially extending lip.

11. A pneumatic tire and wheel assembly as claimed in claim 4 in which the tire bead has a bead wire and a reinforcing ply wrapped at least partly around the bead wire and terminating in an annular surface extending at least partly across the outer layer of hard rubber.

* * * * *